US012644389B2

(12) United States Patent
Horobin

(10) Patent No.: US 12,644,389 B2
(45) Date of Patent: Jun. 2, 2026

(54) GAS TURBINE ENGINE CONTROL SYSTEM

(71) Applicant: ROLLS-ROYCE plc, London (GB)

(72) Inventor: Marcus S Horobin, Bristol (GB)

(73) Assignee: ROLLS-ROYCE plc, London (GB)

( * ) Notice: Subject to any disclaimer, the term of this patent is extended or adjusted under 35 U.S.C. 154(b) by 158 days.

(21) Appl. No.: 18/430,055

(22) Filed: Feb. 1, 2024

(65) Prior Publication Data

US 2024/0287913 A1 Aug. 29, 2024

(30) Foreign Application Priority Data

Feb. 24, 2023 (GB) ...................................... 2302681

(51) Int. Cl.
*F01D 21/00* (2006.01)
*F02C 9/00* (2006.01)
(Continued)

(52) U.S. Cl.
CPC .............. *F01D 21/003* (2013.01); *F02C 9/00* (2013.01); *G05B 13/02* (2013.01);
(Continued)

(58) Field of Classification Search
CPC ......... F01D 21/003; F02C 9/00; G05B 13/02; G05B 2219/2623; G05B 2219/41011;
(Continued)

(56) References Cited

U.S. PATENT DOCUMENTS

| | | | |
|---|---|---|---|
| 4,249,238 A | | 2/1981 | Spang, III et al. |
| 5,558,178 A | * | 9/1996 | Hess ...................... B60K 28/16 |
| | | | 701/1 |

(Continued)

FOREIGN PATENT DOCUMENTS

| | | |
|---|---|---|
| EP | 3 587 272 A1 | 1/2020 |
| EP | 3 633 562 A1 | 4/2020 |

(Continued)

OTHER PUBLICATIONS

Aug. 21, 2023 Search and Examination Report issued in British Patent Application No. GB2302681.8.
(Continued)

*Primary Examiner* — Jelani A Smith
*Assistant Examiner* — Dana D Ivey
(74) *Attorney, Agent, or Firm* — Oliff PLC

(57) ABSTRACT

A computer-based control system for a gas turbine engine includes: a controller including control logic, the controller obtains a set of inputs formed by measurements of one or more process variables and values of one or more engine operation set points, and the control logic determines one or more process command values gas turbine engine operation in response to the set of inputs; and an event detection unit obtaining further measurements of one or more process variables and determine whether an abnormal event has occurred based on the further measurements of one or more process variables. The controller also updates the tuning variables using an event accommodation data array, a given tuning variable being changed in response to detection of a given abnormal event when the respective element in the event accommodation data array is assigned an intervention value.

13 Claims, 11 Drawing Sheets

(51) Int. Cl.
　　*G05B 13/02* 　　　　(2006.01)
　　*G05B 19/042* 　　　(2006.01)

(52) U.S. Cl.
　　CPC .. *G05B 19/0421* (2013.01); *G05B 2219/2623*
　　　　(2013.01); *G05B 2219/41011* (2013.01); *G05B*
　　　　　*2219/41021* (2013.01); *G05B 2219/41028*
　　　　　　　　　　　　　　　　　　(2013.01)

(58) Field of Classification Search
　　CPC ........... G05B 2219/41021; G05B 2219/41028;
　　　　　　　　　　　　　　　　　　G05B 19/0421
　　USPC ........................................................ 701/100
　　See application file for complete search history.

(56) 　　　　　　　References Cited

U.S. PATENT DOCUMENTS 6,186,447 B1 　　2/2001 　Virdee
11,788,475 B2 * 10/2023 　Ettorre ...................... F02C 9/30
　　　　　　　　　　　　　　　　　　60/39.281

| | | | |
|---|---|---|---|
| 2008/0228338 A1 * | 9/2008 | Howard | G05B 23/0278 |
| | | | 701/31.4 |
| 2011/0004390 A1 * | 1/2011 | Nomura | F02C 9/34 |
| | | | 701/100 |
| 2017/0356302 A1 * | 12/2017 | Descamps | F02C 9/46 |
| 2018/0187608 A1 | 7/2018 | Thazhathil Koyampurath et al. | |
| 2019/0131902 A1 | 5/2019 | Ciciriello et al. | |

FOREIGN PATENT DOCUMENTS

| EP | 3 633 563 A1 | 4/2020 |
|---|---|---|
| JP | 2001-263095 A | 9/2001 |

OTHER PUBLICATIONS

Jul. 3, 2024 Extended Search Report issued in European Patent Application No. 24154707.4.

* cited by examiner

S100

Obtain further measurements of one or
more process variables

S200

Determine if abnormal event has
occurred

S300

Abnormal
event
detected?

N

S460

Output standard data
array to controller

Y

S410

Look up corresponding pre-set data
array in database

S430

Select corresponding pre-set data array
as event accommodation data array

S450

Output event accommodation data array

| | | D_PDL | F_NHDOT_LIM | F_WFE_DEM | | Priority | | Severity |
|---|---|---|---|---|---|---|---|---|
| DA_normal | = [ | 0, | 1.0, | 1.0 | ] [ | - | [ | - |
| DA_stall_1 | = [ | -1, | 1.0, | 1.0 | ] | 2 | | 1 |
| DA_stall_2 | = [ | -3, | 1.0 | 1.0 | ] | 2 | | 2 |
| DA_stall_3 | = [ | -5, | 1.0 | 0.9 | ] | 2 | | 3 |
| DA_flameout | = [ | 0, | 1.0, | 0 | ] | 1 | | - |
| DA_adverse_weather | = [ | 0 | 0.8 | 0.9 | ] | 3 | | ] ] |

GAS TURBINE ENGINE CONTROL SYSTEM

This specification is based upon and claims the benefit of priority from UK Patent Application Number 2302681.8 filed on 24 Feb. 2023, the entire contents of which are incorporated herein by reference.

BACKGROUND

Field of the Disclosure

The present invention relates to a computer-based control system for a gas turbine engine, a gas turbine engine, and a method of detecting and accommodating an abnormal event in the operation of a gas turbine engine.

Background of the Disclosure

Controllers for modern aircraft engines are based on digital electronics. Specifically, an aero engine typically has a Full Authority Digital Electronic Controller (FADEC), at the centre of which is Engine Electronic Controller (EEC). A control system for a gas turbine engine such as a FADEC is designed to remove, as far as possible, workload from the operator of the gas turbine engine, while still allowing them ultimate control of the engine. To achieve this, the control system monitors process variables related to the engine and the environment it is operating in and, when the operator specifies set points for operation of the engine, such as a power demand, the system then outputs a range of process command values in order to reach the set points while maintaining the engine safely within its operating limits.

Safety is an important design consideration in any aircraft gas turbine engine. Another high priority is availability—the loss of power from an engine, although not necessarily a safety hazard, can cause severe operational disruption. Thus, control systems for gas turbine engines typically contain control logic to address the effects of adverse operating conditions or of particular engine or control system failures, which could represent a threat to the gas turbine engine if not accommodated.

In conventional control systems, an event detection unit is provided to detect abnormal engine events, for example, engine overspeed or compressor stall, based on measured process variables. A controller within the control system then contains control logic that specifies the type of intervention (e.g. applying an offset to a power level demand from the engine operator) to be taken in response to each type of abnormal engine event. It may also be possible to adjust the degree of intervention (e.g. the size of the offset to a power level demand).

During the development of a gas turbine engine, it is common for control system development to commence with conservative control logic that controls the gas turbine engine with a large safety margin at the cost of engine performance. As engine development and testing progresses and testing and service experience is gained, the control system may be adapted to refine the control system and alter the balance between the safety margin and engine performance. However, this requires modification of the portion of the control system for responding to abnormal engine events at the control logic level, which can be time consuming and complex due to the level at which the control logic is integrated into the control system.

The present invention has been devised in light of the above considerations.

SUMMARY OF THE INVENTION

It is desired to provide a control system wherein both the type and degree of interventions that are implemented in response to detecting an abnormal event in the operation of a gas turbine engine can be modified by data inputs into the control system, rather than necessitating a change to the control logic of the control system.

In a first aspect there is provided a computer-based control system for a gas turbine engine. The control system comprises a controller comprising control logic, the controller configured to obtain a set of inputs formed by (i) measurements of one or more process variables and (ii) values of one or more engine operation set points, and the control logic configured to determine one or more process command values for operation of the gas turbine engine in response to the set of inputs. The control system further comprises an event detection unit configured to obtain further measurements of one or more process variables and determine whether an abnormal event has occurred based on the further measurements of one or more process variables. The controller comprises a plurality of tuning variables for altering the one or more process command values output by the control logic in response to a given set of inputs, the tuning variables having respective standard values for normal operation of the gas turbine engine. The event detection unit is configured to output an event accommodation data array to the controller when an abnormal event is detected, each element in the event accommodation data array corresponding to a respective tuning variable and one or more of the elements assigned intervention values for their respective tuning variables. The controller is configured to update the tuning variables using the event accommodation data array, a given tuning variable being changed in response to detection of a given abnormal event when the respective element in the event accommodation data array is assigned an intervention value.

Accordingly, the types of interventions that are implemented in response to detecting an abnormal event may be controlled by which elements in the event accommodation data array output in response to detecting the abnormal event are assigned intervention values. Additionally, the degree of interventions that are implemented in response to detecting an abnormal event may be controlled by the values of the elements in the event accommodation data array that are assigned intervention values. This is particularly beneficial during the development stages of a gas turbine engine, as the control system may be adapted to refine the control system and alter the balance between the safety margin and engine performance without requiring modifications to the control logic of controllers within the control system.

The measurements of one or more process variables of the set of inputs used by the control logic may be the same measurements as the further measurements of one or more process variables used by the event detection unit. However, another option is for the measurements of one or more process variables of the set of inputs used by the control logic to be different from the further measurements of one or more process variables used by the event detection unit. Yet another option is for the measurements of one or more process variables of the set of inputs used by the control logic and the further measurements of one or more process variables used by the event detection unit to share one or some measurements.

The controller may be configured to update the tuning variables (i.e. change the values assigned to the tuning variables) by assigning the tuning variables the values in the respective elements of the event accommodation data array. Another option is for the controller to be configured to update the tuning variables by combining the current value assigned to a given tuning variable with the value of the respective element of the event accommodation data array; for example, by multiplying the current tuning variable value by the value in the event accommodation data array, or summing the current tuning variable value with the value in the event accommodation data array. Other possible mathematical operations will be apparent to the skilled person.

Accordingly, an intervention value in the event accommodation data array may be understood as any value assigned to an element in the event accommodation data array that causes the respective tuning variable to be assigned a value that is not a standard value for that tuning variable when the controller updates the tuning variables using the event accommodation data array. Elements in an event accommodation data array that are not assigned an intervention value may be assigned a standard value corresponding to a standard value of the respective tuning variable. That is, a standard value for an element in an event accommodation data array may be understood as a value that causes the respective tuning variable to be assigned a value that is a standard value for that tuning variable when the controller updates the tuning variables using the event accommodation data array.

A given tuning variable may have a single standard value for normal operation of the gas turbine engine. Alternatively, that given tuning variable may have multiple standard values for normal operation of the gas turbine engine, the standard values corresponding to respective modes of normal operation of the gas turbine engine. This may allow the tuning variables to have different standard values depending on the type of operation being conducted by the gas turbine engine (e.g. start-up, rapid start-up, steady-state operation, shut-down, emergency shut down).

The controller may be configured to output the one or more process command values to other elements of the control system. This may allow the process command values to be implemented into control of the engine such that the engine is operated in the manner determined by the controller.

The control system may be a full authority digital electronic controller (FADEC).

The controller may be an electronic engine controller (EEC).

The controller may be configured to obtain measurements of one or more process variables selected from a group including: engine gas temperature(s), engine component temperature(s), engine pressure(s), rotor speed(s), actuator position(s), valve position(s), vibration measurement(s), weather measurement(s), strain measurement(s) (e.g. via a strain gauge), displacement measurement(s) (e.g. via a strain gauge), and user input(s). Likewise, the event detection unit may be configured to obtain further measurements of one or more process variables selected from a group including: engine gas temperature(s), engine component temperature (s), engine pressure(s), rotor speed(s), actuator position(s), valve position(s), vibration measurement(s), weather measurement(s), strain measurement(s) (e.g. via a strain gauge), displacement measurement(s) (e.g. via a strain gauge), and user input(s).

The controller may be configured to obtain values of one or more engine operation set points selected from a group including: a power level demand, a compressor operating point demand (e.g. a specific value of a composite parameter built up from various pressure measurements, the operating point demand being specified, for example, as a fan pressure ratio) and a bypass ratio demand. The event detection unit may be further configured to obtain the set-point values and determine whether an abnormal event has occurred based on the further measurements of one or more process variables and the one or more set-point values.

The control system may further comprise a database containing a plurality of pre-set data arrays for output as event accommodation data arrays, the event detection unit being configured to select one of the pre-set data arrays as the event accommodation data array. This may allow the speed of response of the control system to the detection of an abnormal event to be increased because the event detection unit can access the database and select a pre-set data array to use. Moreover, having a plurality of pre-set data arrays stored in a database allows the response of the control system to a given abnormal event to be altered by modifying the contents of the database, as opposed to the more complex process of modifying the control logic of the control system.

Where the control system comprises the aforementioned database, the pre-set data arrays may correspond to respective abnormal events; and the event detection unit may be configured to select a given pre-set data array as the event accommodation data array in response to detecting the respective abnormal event for that pre-set data array. This may further increase the speed with which the event detection unit is able to output an appropriate event accommodation data array following detection of an abnormal event, because the event detection unit can simply carry out a database lookup function for the abnormal event it has detected and select a corresponding pre-set data array.

The database may comprise plural pre-set data arrays corresponding to a given abnormal event and a severity value for each of said plural pre-set data arrays. The event detection unit may then be further configured to select the pre-set data array having the lowest severity value amongst said plural pre-set data arrays as the event accommodation data array in response to detecting the respective abnormal event for said plural pre-set data arrays and subsequentially sequentially select said plural pre-set data arrays as the event accommodation data array in order of increasing severity until cessation of detection of the abnormal event. Advantageously, this allows the control system to avoid taking high severity control action in response to an abnormal event that could be addressed by taking lower severity control action. This can reduce disruption to the operation of the engine.

The severity value of a pre-set data array may reflect the extent to which the operation of the engine deviates from a normal operational mode when that pre-set data array is selected, outputted as an event accommodation data array by the event detection unit and used by the controller to update the tuning variables. A higher severity value may correspond to a greater deviation from a normal operational mode, or vice versa.

Where the database comprises a severity value and the event detection unit is configured to sequentially select said plural pre-set data arrays as the event accommodation data array in order of increasing severity until cessation of detection of the abnormal event, the event detection unit may be configured to select the next pre-set data array in the sequence in response to a pre-determined period of time passing since the present event accommodation data array was selected. This may allow time for the present event accommodation data array to be used to update the tuning variables and for the updated tuning variables to influence the operation of the engine and possibly cause the cessation of the abnormal event.

Additionally, or alternatively, to the database containing a severity value for each of the plural pre-set data arrays corresponding to a given abnormal event, the plurality of pre-set data arrays may comprise one or more pre-set data arrays that correspond to said given abnormal event, but differ in strategy/philosophy i.e. that result in different tuning variables being changed when the controller updates the tuning variables using one of said arrays in comparison to when the controller updates the tuning variables using another of said arrays. This is in contrast to sequentially selecting a plurality of pre-set data arrays in order of increasing severity as the event accommodation data array, which typically result in the same tuning variables being changed, but the extent to which they are changed from their standard value varying with array severity.

The database may further comprise an associated priority for each pre-set data array and the event detection unit may be further configured to: determine whether an additional abnormal event has occurred based on the further measurements of one or more process variables; and select the pre-set data array having the highest priority amongst the pre-set data arrays corresponding to the detected abnormal events as the event accommodation data array in response to determining that an additional abnormal event has occurred. Advantageously, this may facilitate the control system handling a situation where multiple abnormal events have occurred and one of those abnormal events needs to be accommodated in preference to the other(s), the priority with which an abnormal event needs to be accommodated being reflected in the priority associated with the pre-set data array corresponding to that abnormal event.

The database may further comprise a priority data array storing the priorities associated with the pre-set data arrays.

Alternatively to using a priority associated with each pre-set data array to determine which pre-set data array to select when multiple abnormal events are detected, the event detection unit may be further configured to determine whether an additional abnormal event has occurred based on the further measurements of one or more process variables and to output a further event accommodation data array to the controller when a further abnormal event is detected. The controller may then be further configured to receive the further event accommodation data array from the event detection unit and to update the tuning variables using a combination of the two event accommodation data arrays. This may facilitate the control system responding to multiple abnormal events simultaneously. The controller may be configured to update the tuning variables using a combination of the two event accommodation data arrays by conducting an element-wise summation of the event accommodation data array and the further event accommodation data array to produce a combined event accommodation data array that is then used to update the tuning variables. Alternatively, the controller may be configured to update the tuning variables using a combination of the event accommodation data arrays by conducting an element-wise mean average of the event accommodation data arrays to produce a combined event accommodation data array that is then used to update the tuning variables.

Another possible configuration of the control system for responding to the determination that an additional abnormal event has occurred is for data arrays to be provided that correspond to that specific combination of the abnormal event and additional abnormal event i.e. the combination of events is treated as a specific 'multi-event' event with a corresponding 'multi-event data array'. The database may contain such multi-event data arrays and the event detection unit may be configured to select one of said multi-event data arrays upon detection of the abnormal event and additional abnormal event that it corresponds to. This may be advantageous where two or more abnormal events often occur in tandem with each other.

The event detection unit may be further configured such that, having detected an abnormal event and output the event accommodation data array to the controller, the event detection unit outputs a standard data array to the controller on cessation of detection of the abnormal event, each element in the standard data array being assigned a standard value corresponding to the standard value of its respective tuning variable. A standard value for an element in an event accommodation data array may be understood as a value that causes the respective tuning variable to be assigned a standard value for that tuning variable when the controller updates the tuning variables. The controller may be configured to receive the standard data array from the event detection unit and update the tuning variables using the standard data array. The process of updating the tuning variables using the standard data array may be equivalent to the above-described process of updating the tuning variables using the event accommodation data array. Advantageously, this may allow the control system to revert to a normal operating mode of the engine once the abnormal event has been accommodated.

Where the control system comprises the database, the standard data array may be contained in the database.

Alternatively, or additionally, the event detection unit may be configured to receive a user command, and to output the standard data array to the controller in response to the user command. This can provide a manual override for the control system's detection of an abnormal event.

Alternatively, or additionally, the event detection unit may be configured to output the standard data array to the controller in response to the passing of a set duration from the original detection of the abnormal event.

The control logic may be configured to apply one or more of the tuning variables as gains within the control logic.

The control logic may be configured to apply one or more of the tuning variables as offsets within the control logic.

The event detection unit may be configured to detect one or more abnormal events from a group including: overspeed of the gas turbine engine; overspeed of one or more compressors; over-power of the gas turbine engine; over-torque of the gas turbine engine; main engine flameout; afterburner flameout; afterburner buzz; afterburner screech; control-system sensor input fault; main engine surge; surge of one or more compressors; nozzle positioning error; main engine fuel metering error; afterburner fuel metering error; variable inlet guide vane position error; bleed air duct rupture within engine; bleed air duct rupture within the engine installation envelope; fault within an embedded electrical machine; panic-button pressed (the panic-button being an actual or virtual programmable button returning a Boolean indicating whether it has been pressed or not); compressor stall; and adverse weather.

The tuning variables may be selected from a group including: a power level demand offset; a maximum acceleration and deceleration limit; a fuel flow demand gain; a nozzle area demand offset; a primary afterburner fuel flow demand gain; a core afterburner fuel flow demand gain; a bypass afterburner fuel flow demand gain; an afterburner fuel cut off Boolean; and an operator display text field setting.

The one or more process command values may be selected from a group including: an actuator demand, a fuel flow demand; a bleed valve position; a compressor stator vane angle; a tip clearance; an ignition signal; and an engine starter signal.

In a second aspect there is provided a gas turbine engine comprising the control system according to the first aspect, wherein the controller is configured to output the one or more process command values to operate the gas turbine engine.

In a third aspect there is provided an aircraft having a gas turbine engine according to the second aspect.

In a fourth aspect there is provided the use of the event detection unit of the computer-based control system for a gas turbine engine according to the first aspect to detect an abnormal event and modify the response of the controller of the computer-based control system to the abnormal event.

In a fifth aspect there is provided a computer-implemented method of detecting and accommodating an abnormal event in the operation of a gas turbine engine using a control system, wherein: the control system comprises a controller, the controller comprising control logic and being configured to obtain a set of inputs formed by (i) measurements of one or more process variables and (ii) values of one or more engine operation set points; the control logic is configured to determine one or more process command values for operation of the gas turbine engine in response to the set of inputs; the controller further comprises a plurality of tuning variables for altering the one or more process command values output by the control logic in response to a given set of inputs, the tuning variables having respective standard values for normal operation of the gas turbine engine. The method according to the fifth aspect comprises the steps of: obtaining further measurements of one or more process variables; determining whether an abnormal event has occurred based on the further measurements of one or more process variables; outputting an event accommodation data array in response to detecting an abnormal event, each element in the event accommodation data array corresponding to a respective tuning variable and one or more of the elements assigned intervention values for their respective tuning variables; and updating the tuning variables using the event accommodation data array, a given tuning variable being changed in response to detection of a given abnormal event when the respective element in the event accommodation data array is assigned an intervention value.

Thus, the method of the fifth aspect corresponds to the computer-based control system of the first aspect. Optional features of system of the first aspect pertain also to method of the fifth aspect.

The method according to the fifth aspect is computer-implemented. Accordingly, further aspects of the present disclosure provide: a computer program comprising code which, when the code is executed on a computer, causes the computer to perform the method of the fifth aspect; a computer readable medium storing a computer program comprising code which, when the code is executed on a computer, causes the computer to perform the method of the fifth aspect; and a data processing system comprising one or more processors adapted to perform the method of the fifth aspect. The aforementioned data processing systems may further include: a computer-readable medium operatively connected to the processors, the medium storing a database.

The system may further include a display device for communication with the operator of the gas turbine engine.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art.

Figure 1:
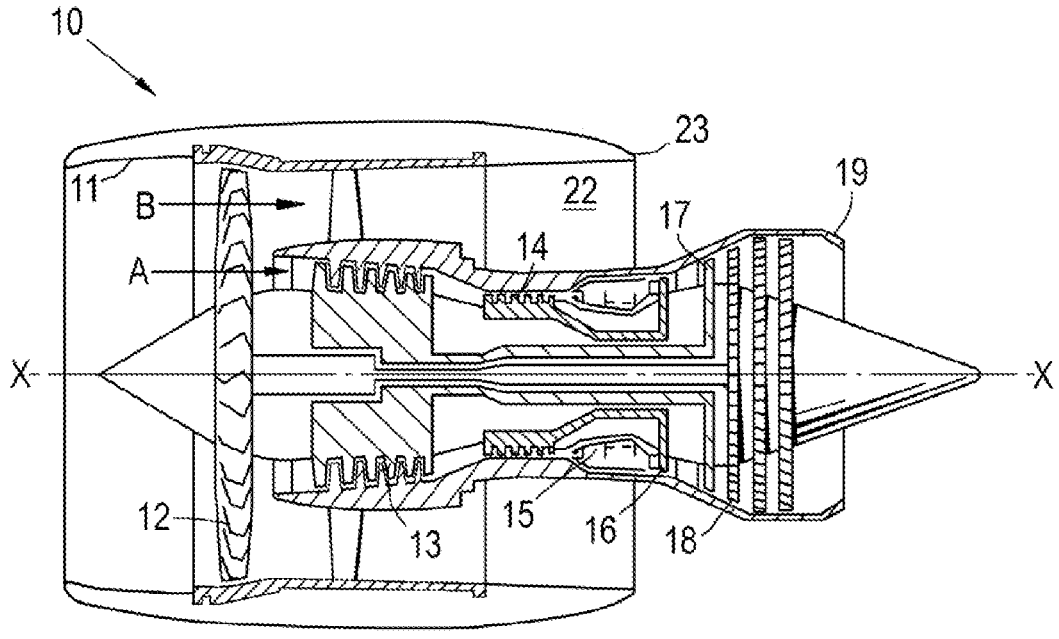
FIG. 1 shows a longitudinal cross-section through a ducted fan gas turbine engine.

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2A:
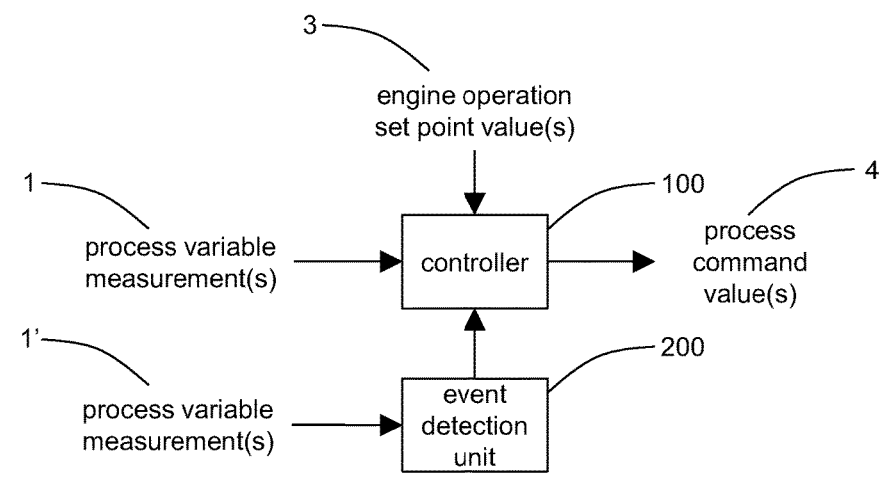
FIG. 2A shows an example of architecture of a control system for detecting and responding to abnormal events.

FIG. 2A shows an example of architecture of a FADEC control system for detecting and responding to abnormal events relating to the operation of the gas turbine engine 10. The control system comprises an EEC 100 and an event detection unit 200.

The controller 100 is configured to obtain measurements of one or more process variables 1 as an input. These process variables relate to the operation of the gas turbine engine and typically measurements are obtained by sensors forming part of the control system. The process variables, for example, may relate to engine temperature(s), engine pressure(s), rotor speed(s), valve position(s), vibration measurement(s), weather measurement(s) and user input(s). The controller 100 further obtains one or more engine operation set point values 3 as an input. The engine operation set point values may comprise values specified by the operator of the gas turbine engine (e.g. a pilot in an aircraft) and/or may be values set within the control system over which the pilot does not have control. The one or more engine operation set points that the controller 100 obtains values for may include a power level demand (i.e. a thrust demand) and a bypass ratio demand (i.e. the proportion of the air passing through the propulsive fan 12 of the engine that does not pass through the intermediate-pressure compressor). A set of inputs into the controller 100 is formed by (i) the process variable measurements 1 and (ii) the engine operation set point values 3. The controller 100 is configured to output one or more process command values 4 in response to obtaining a set of inputs. The one or more process command values 4 output by the controller are for controlling operation of the gas turbine engine 10 by components in the engine being set in accordance with those process command values 4. The process command values 4 are output to other elements of the control system and implemented into the control of the engine such that the engine moves towards the operation set point values 4. Possible process command values 4 include, for example, an actuator demand; a fuel flow demand, a bleed valve position, a compressor stator vane angle, a tip clearance, an ignition signal, and an engine starter signal. The controller 100 comprises control logic that is used to determine the process command values 4 to output in response to the set of inputs. The control logic is discussed further below in reference to FIG. 2B.

The control system in FIG. 2A further comprises an event detection unit 200. During operation of the gas turbine engine 10, it is possible for abnormal engine events to occur that impact the functioning of the engine. Such abnormal events may be caused by factors that are external to the engine (e.g. weather conditions), or factors that are internal to the engine (e.g. an error or malfunction in the functioning of a component of the engine). The event detection unit 200 is configured to obtain further measurements of one or more process variables 1' and to determine, based on those further process variable measurements 1', whether an abnormal event has occurred. The event detection unit 200 is in communication with the controller 100 such that the detection of an abnormal event by the event detection unit 200 can be reflected in the operation of the controller 100 in order to accommodate the abnormal event and, critically, maintain the safety and, ideally, availability of the gas turbine engine 10 in spite of that abnormal event. The further measurements of one or more process variables 1' used by the event detection unit 200 may be the same, different or overlap with the measurements of one or more process variables 1 used by the controller 100.

Figure 2B:
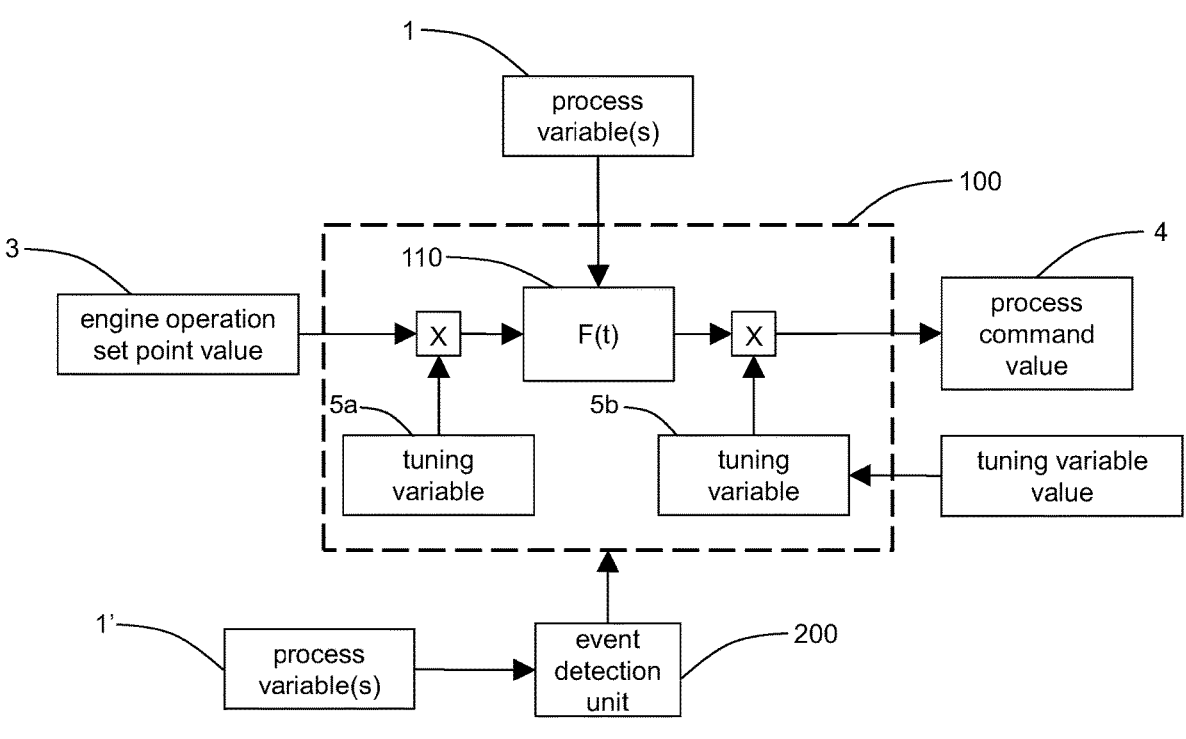
FIG. 2B shows details of control logic within the controller of the control system in FIG. 2A.

FIG. 2B shows an example of control logic contained within the controller 100 of the control system. The measurements of one or more process variables 1 obtained by the controller 100 are input into a control function F(t) 110, alongside an engine operation set point value 3. The control function 110 is configured to determine an appropriate value for a process command in order to move towards the engine operation set point value 3, based on the process variable measurements 1. However, the process command value determined by the control function 110 is not output directly from the controller 100, rather two tuning variables 5a, 5b are also present in the controller 100 that are used to modify the process command value output from the control function 110 in response to the set of inputs. In the case of FIG. 2B, the tuning variable 5a is a gain that is applied to the engine operation set point value 3 and the tuning variable 5b is a gain that is applied to the output from the control function 110. That is, the engine operation set point value is multiplied by the tuning variable 5a to provide the set point value inputted into the control function 110 and the output from the control function 110 is multiplied by the tuning variable 5b to provide the process command value 4 that is output from the controller 100. The values of the tuning variables 5a, 5b can be adjusted in order to control the response of the controller 100 to a set of inputs.

Figure 3:
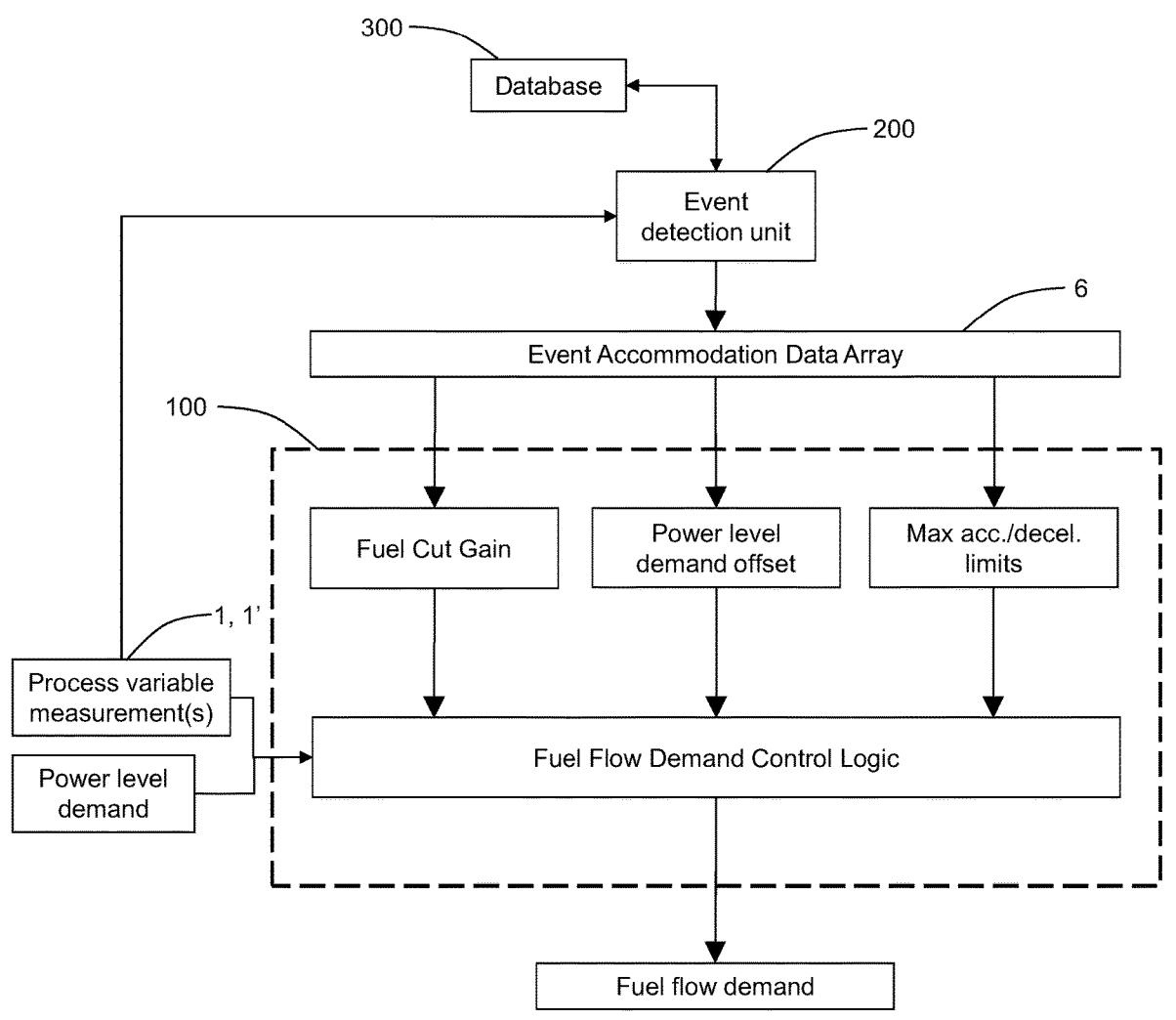
FIG. 3 shows the control system in more detail in the context of implementing a power level demand.

FIG. 3 shows the control system in more detail in the context of implementing a power level demand. The controller 100 receives a set of inputs formed by (i) process variable measurements 1 and (ii) the power level demand (which is an example of an engine operation set point value 3). The controller 100 comprises fuel flow demand control logic configured to determine a fuel flow demand value in response to the set of inputs, which the controller 100 then outputs as a process command value 4. The controller 100 in FIG. 3 comprises three possible tuning variables 5 that can be used to modify the fuel flow demand value determined by the controller in response to a given set of inputs: a fuel cut gain, a power level demand offset, and maximum acceleration and deceleration limits. Each tuning variable 5 can be considered to have a standard value for normal operation of the gas turbine engine 10.

Figure 4:
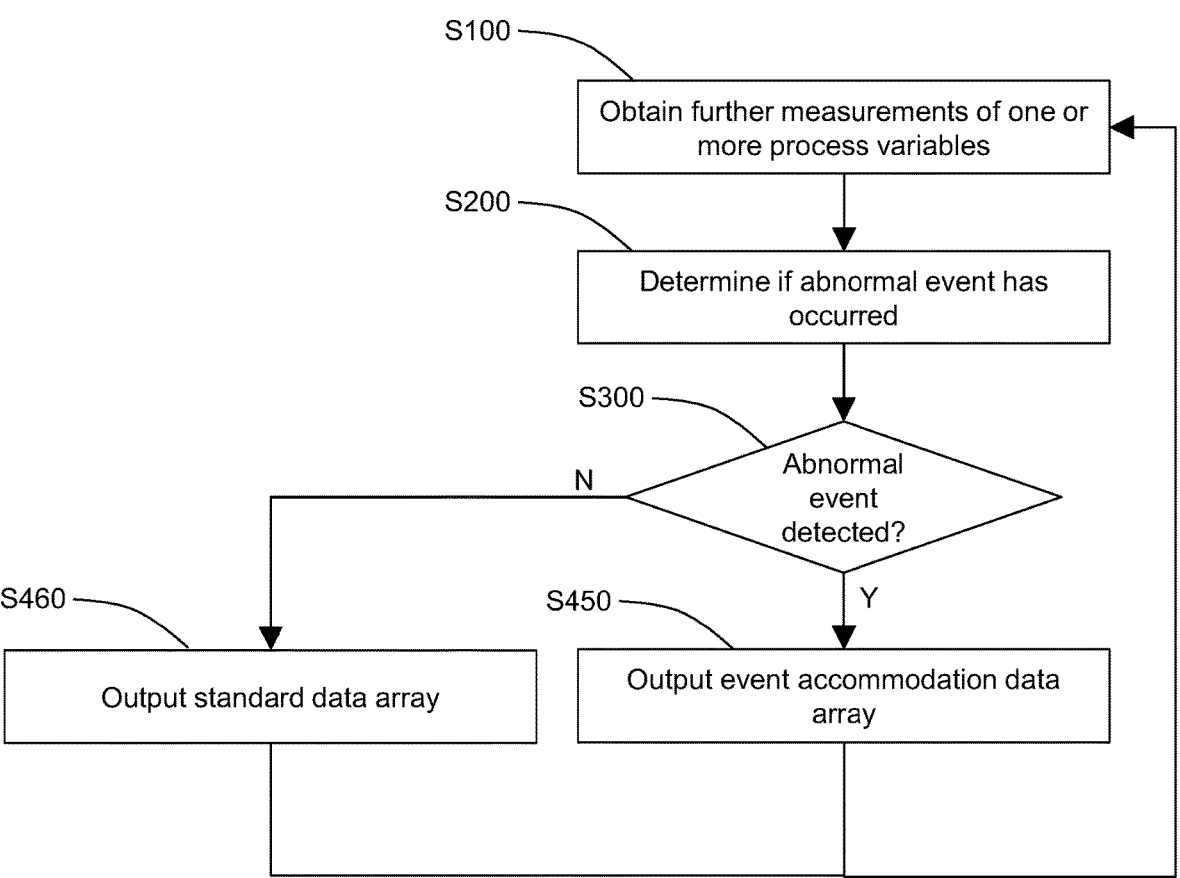
FIG. 4 is a flowchart detailing steps of a control process for use with the control system of FIG. 3.

The event detection unit 200 is configured to carry out the series of steps illustrated in the flowchart of FIG. 4. Firstly, the event detection unit 200 obtains further measurements of one or more process variables 1' (step S100). In the example of FIG. 3, the same process variable measurements 1 obtained by the controller 100 are also obtained by the event detection unit 200 as the further process variable measurements 1'. Subsequently, the event detection unit 200 determines whether an abnormal event has occurred based on the further process variable measurements 1' (step S200). The abnormal events that the event detection unit 200 is configured to detect includes one or more of: overspeed of the gas turbine engine; overspeed of one or more compressors; over-power of the gas turbine engine (specific to a turboprop or turboshaft engine, over-power may be detectable before overspeed of that engine is detectable); over-torque of the gas turbine engine (over-torque may be detectable before overspeed of that engine is detectable) main engine flame-out; afterburner flameout; afterburner buzz; afterburner screech; control-system sensor input fault; main engine surge; surge of one or more compressors; nozzle positioning error; main engine fuel metering error; afterburner fuel metering error; variable inlet guide vane position error; bleed air duct rupture within engine; bleed air duct rupture within the engine installation envelope; fault within an embedded electrical machine; panic-button pressed (the panic-button being an actual or virtual programmable button returning a Boolean indicating whether it has been pressed or not); compressor stall; and adverse weather. If an abnormal event has occurred (step S300) the event detection unit 200 outputs an event accommodation data array 6 to the controller 100 (step S450) to modify the behaviour of the controller 100 in order to accommodate the abnormal event. However, if an abnormal event is not detected (step S300), then the event detection unit 200 proceeds to output a standard data array to the controller 100 (step S460). Each element in the standard data array is assigned a standard value corresponding to the standard value of its respective tuning variable 5. A standard value for an element in the standard data array may be understood as a value that causes the respective tuning variable 5 to be assigned a value that is a standard value for that tuning variable 5 when the controller updates the tuning variables 5. Having output an event accommodation data array 6 or a standard data array, the event detection unit 200 returns to obtain further measurements of one or more process variables 1 (step S100) and above sequence of steps repeats.

Alternatively, or additionally, to the event detection unit 200 being configured to output a standard data array in response to no longer detecting an abnormal event based on the further measurements of one or more process variables 1, the event detection unit 200 can also be configured to receive a user command and output a standard data array in response to that user command and/or to output a standard data array in response to the passing of a set duration from the original detection of the abnormal event.

In the example of FIG. 3, the event accommodation data array 6 output by the event detection unit 200 contains three elements, each element in the array 6 corresponding to a respective tuning variable 5 in the controller 100 (i.e. the fuel cut gain, the power level demand offset and the maximum acceleration and deceleration limits). The control system in FIG. 3 further includes a database 300 in communication with the event detection unit 200. The database 300 contains a plurality of pre-set data arrays that are suitable for output as event accommodation data arrays 6. The event detection unit 200 is configured to select one of the pre-set data arrays as the event accommodation data array 6 that it then outputs to the controller 100. Accordingly, having determined that an abnormal event has occurred, the event detection unit 200 is configured to select a pre-set data array contained in the database 300, rather than calculating an event accommodation data array 6 in response to the detected event. Thus, the event accommodation data arrays 6 that the event detection unit 200 outputs can be altered by modifying the contents of the database 300, rather than requiring modification of the logic of the event detection unit 200. Specifically, a method of modifying the types of intervention implemented by the control system in response to detecting a given abnormal event involves adapting the event accommodation data array 6 output by the control system in response to that given event such that: an element in the event accommodation data array 6 that was assigned a standard value corresponding to a standard value of its respective tuning variable 5 is assigned an intervention value, and/or an element in the even accommodation data array 6 that was assigned an intervention value for its respective tuning variable 5 is assigned a standard value corresponding to a standard value of its respective tuning variable 5. Where there is a database 300 present in the control system, this method can be effected by making corresponding modifications to a pre-set data array contained in the database 300.

Figure 5:
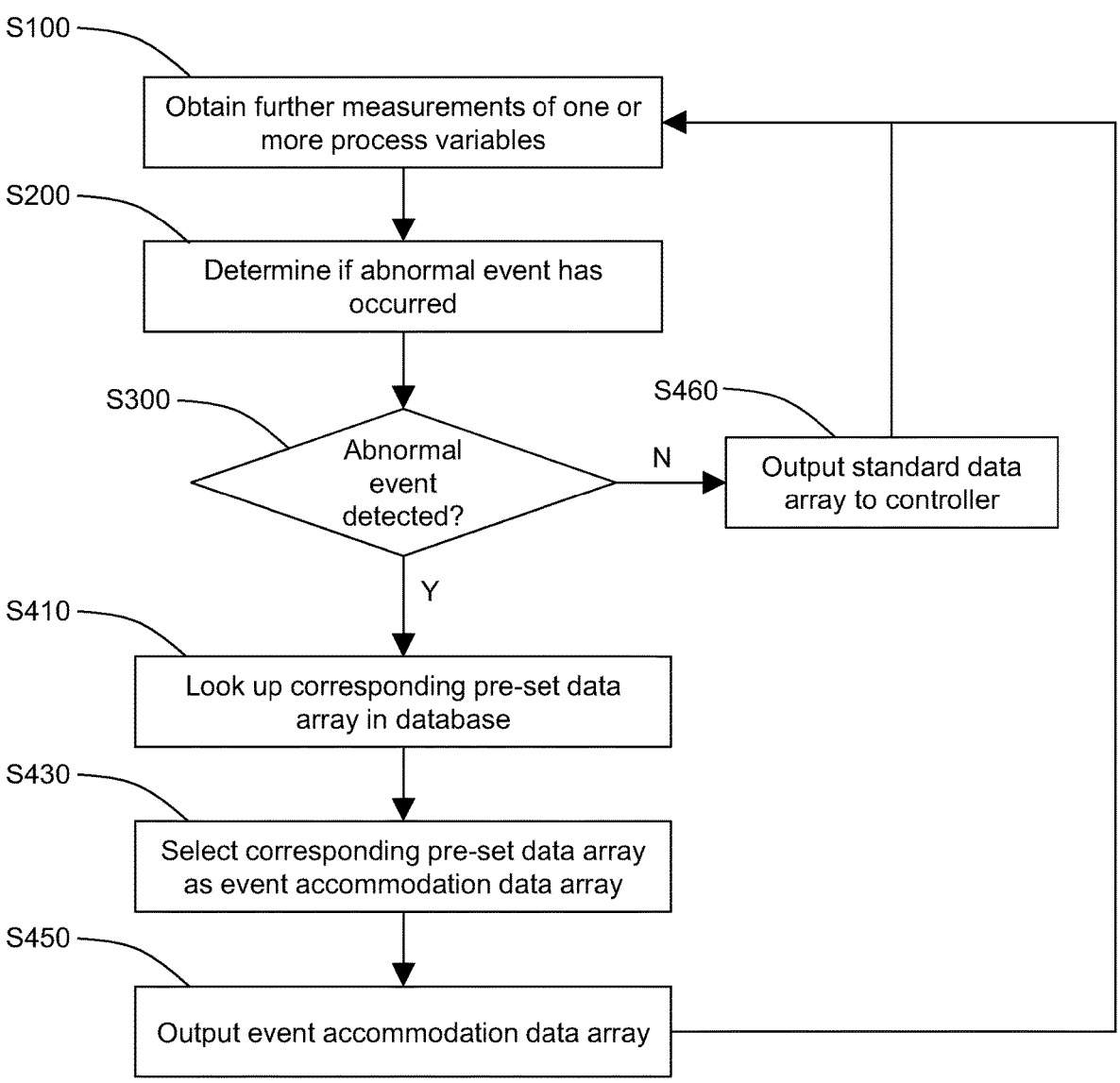
FIG. 5 is a flowchart detailing steps of a control process that is a modification of the control process of FIG. 4.

Typically, the pre-set data arrays contained in the database 300 correspond to respective abnormal events that may be detected by the event detection unit 200. The flowchart shown in FIG. 5 illustrates the steps that the event detection unit 200 is configured to carry out when this is the case. Steps S100-S300 and step S460 in FIG. 5 are the same as those discussed above in relation to FIG. 4. In FIG. 5, where an abnormal event is detected (step S300), the event detection unit 200 proceeds to look up the corresponding pre-set data array from the database 300 (step S410) and selects the corresponding pre-set data array as the event accommodation data array 6 (step S430). This event accommodation data array 6 can then be output from the event detection unit 200 (step S450) as in FIG. 4. The look up and selection steps (steps S410 and S430) can be carried out by a database lookup function, allowing the event detection unit 200 to very quickly select the appropriate pre-set data array and output the event accommodation data array 6 after detecting an abnormal event.

On receipt of an event accommodation data array 6 or a standard data array from the event detection unit 200, the controller 100 is configured to update the tuning variables 5 using the event accommodation data array 6 or standard data array. Where the controller 100 receives an event accommodation data array 6, it uses the event accommodation data array 6 to modify the values assigned to one or more tuning variables 5, so that the engine can safely accommodate the abnormal event. One or more of the elements in the event accommodation data array 6 is assigned an intervention value for its respective value. An intervention value can be understood as a value assigned to an element of an event accommodation data array 6 that, when the event accommodation data array 6 is used by the controller 100 to update the tuning variables 5, causes the value of the respective tuning variable 5 to take a value other than a standard value. Other elements in the event accommodation data array 6 that are not assigned an intervention value are assigned a standard value corresponding to the standard value of its respective tuning variable. On updating of the tuning variables 5 using an event accommodation data array 6, any tuning variable 5 whose respective element in the event accommodation data array 6 is assigned a standard value does not change from its own standard value. Accordingly, a given tuning variable 5 is changed in response to detection of a given abnormal event if the respective element in the event accommodation data array 6 output from the event detection unit 200 in response to that abnormal event is assigned an intervention value. Thus, with the control system in FIG. 3, it is possible to change both the degree of the intervention that is implemented in response to the detection of an abnormal event (by changing the intervention value assigned to a given element in the event accommodation data array 6), and also the type(s) of intervention(s) that is implemented in response to the detection of that abnormal event (by changing which element(s) in the event accommodation data array 6 are assigned an intervention value rather than a standard value). Both these types of modification are possible without modifying the control logic of the controller 100.

Figure 6:
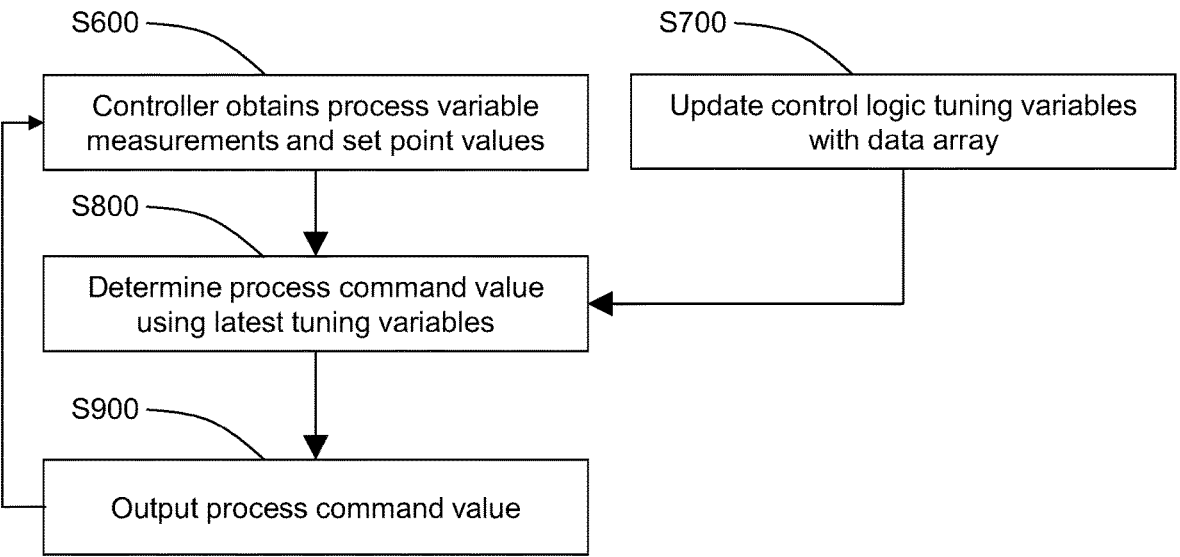
FIG. 6 is a flowchart detailing steps of a control process for use with the control system in FIG. 3.

FIG. 6 is a flowchart showing the sequence of steps carried out by the controller 100. The normal sequence of steps carried out by the controller are to obtain a set of inputs formed by (i) process variable measurements 1 and (ii) set point values 3 (step S600), determine one or more process command values 4 based on that set of inputs, making use of the latest tuning variable values 5 (step S800) and output that process command value 4 (step S900). However, when the controller 100 receives an event accommodation data array 6 from the event detection unit 200, it then updates the tuning variables 5 in the controller 100 using the values of the corresponding elements in the event accommodation data array 6 (step S700), such that next time the controller 100 determines its process command value 4 (step S800), it uses the updated values of the tuning variables 5.

Figure 7:
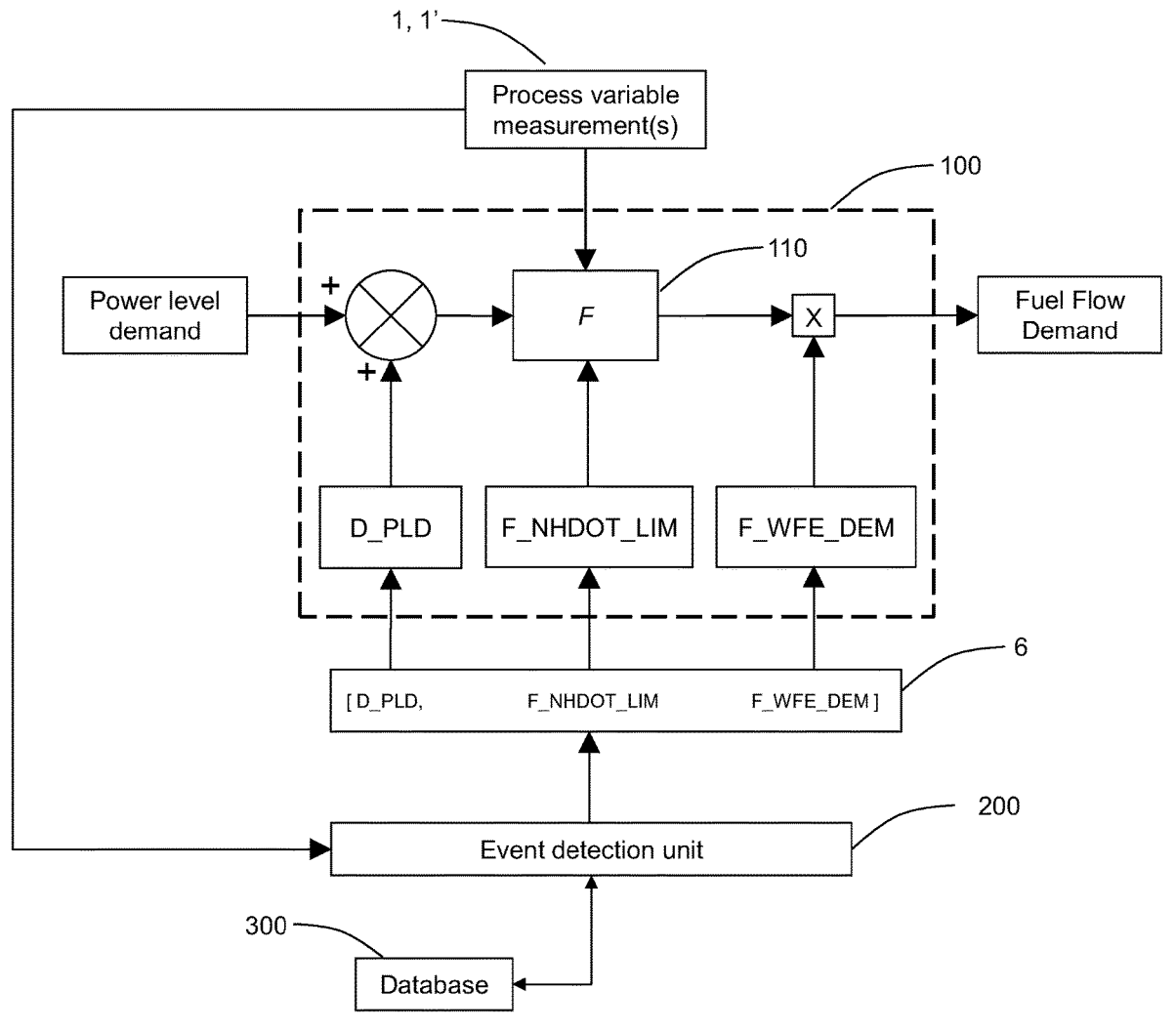
FIG. 7 shows further details of the control logic within the control system of FIG. 3.

FIG. 7 presents details on possible control logic within the controller 100 of FIG. 3 for implementing the event accommodation data array 6. In FIG. 7, the event accommodation data array 6 corresponds to a pre-set data array selected from the database 300 by the event detection unit 200. The event accommodation data array 6 contains values to be assigned to the three tuning variables 5 in FIG. 7: the power level demand offset D_PLD, the maximum acceleration and deceleration limits F_NHDOT_LIM, and the fuel cut gain F_WFE_DEM (i.e. the present values of the tuning variables 5 are replaced with the respective values in the elements of the event accommodation data array 6 on updating the tuning variables 5 using the event accommodation data array 6). Other manners of updating the tuning variables 5 using the event accommodation data array 6 are possible, for example, updating the tuning variables 5 by combining the current value assigned to a given tuning variable 5 with the value of the respective entry of the event accommodation data array 6 (e.g. by multiplying a current tuning variable value by the respective value in the event accommodation data array 6, or summing the tuning variable's current value with the value in the respective element of the event accommodation data array 6).

The three tuning variables 5 in the controller 100 of FIG. 7 feed into its control logic in different manners to each other. Firstly, the power level demand offset is used to offset the power level demand input into the controller 100 as a set point value 3. The offset power level demand is then provided to the control function 110, which also receives the process variable measurements 1 and the maximum acceleration and deceleration limits. The maximum acceleration and deceleration limits are complied with when the control function 110 determines a fuel flow demand based on the offset power level demand and the process variable measurements 1. The fuel flow demand from the control function 110 then has the fuel cut gain applied to it, before the final fuel flow demand is output from the controller 100 as a process command value 4.

The values of the elements in the event accommodation data array 6 are based on the abnormal event detected by the event detection unit 200. For some abnormal events, only one of the elements may be assigned an intervention value (the remainder being assigned standard values) and accordingly only the corresponding tuning variable 5 will change from the standard value of the tuning variable 5 on updating the tuning variables 5 using the event accommodation data array 6. However, for other abnormal events, more than one, or possibly all, of the elements may be assigned intervention values, with all the tuning variables 5 having corresponding array elements assigned intervention values changing from their standard values on updating the tuning variables 5 using the event accommodation data array 6.

Figure 8:
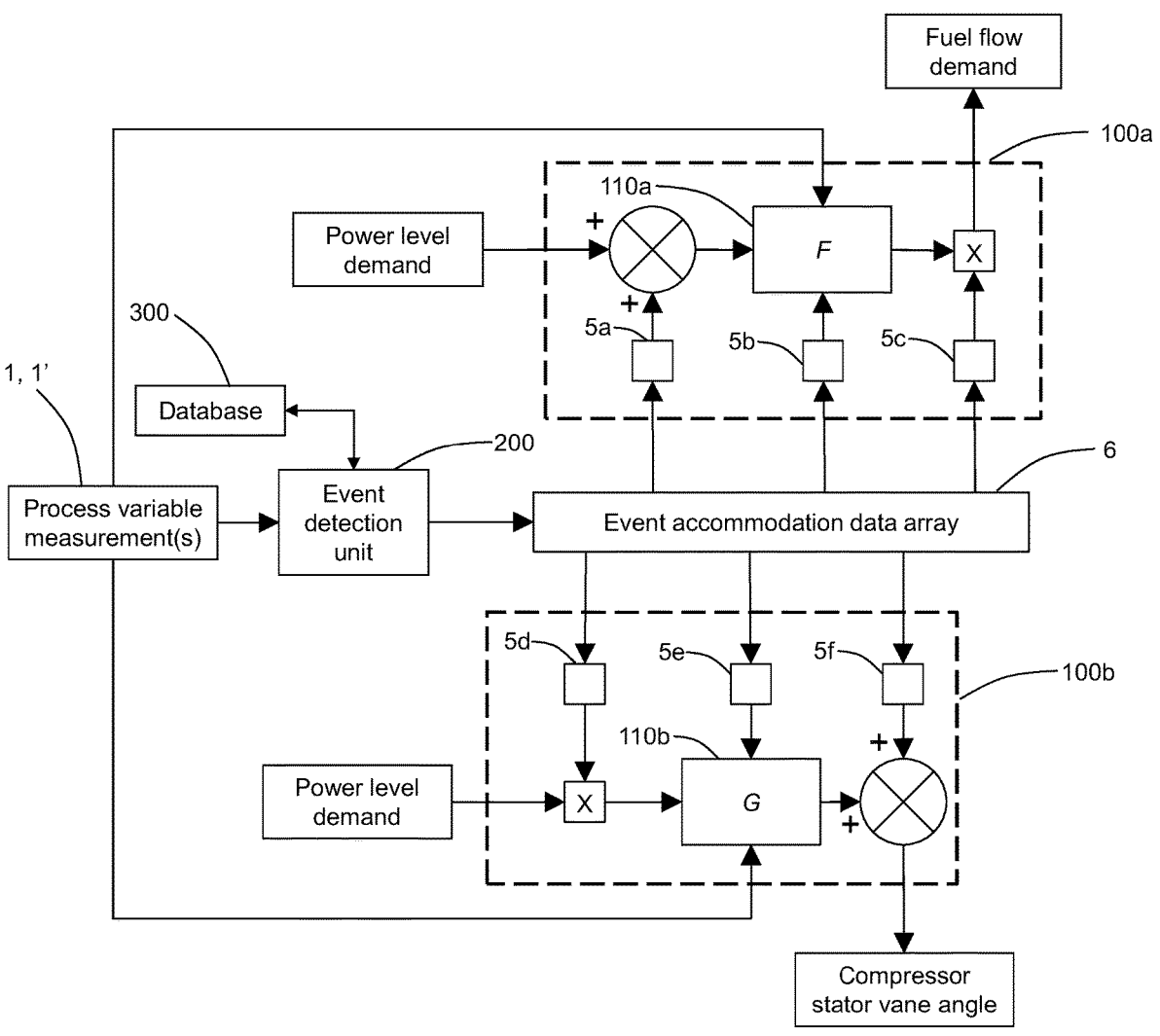
FIG. 8 shows a control system and details of the control logic in that control system.

FIG. 8 shows a control system that is a modification of the control system illustrated in FIGS. 3 and 7. In FIG. 8, the control system comprises a first controller 100*a* that is equivalent to the controller 100 of FIGS. 3 and 7: the first controller 100*a* is configured to obtain a set of inputs formed by (i) one or more process variables 1 and (ii) a power level demand as the engine operation set point value 3 and, and to determine a fuel flow demand as a process command value 4. Three tuning variables 5*a*-5*c* are present in the first controller 100*a*; tuning variable 5*a* is an offset applied to the power demand level, tuning variable 5*b* is an input into the control function 110*a* of the first controller 100*a*, and tuning variable 5*c* is a gain applied to the output of the control function 110*a* of the first controller 100*a*. The control system shown in FIG. 8 further comprises a second controller 100*b*. The second controller 100*b* is configured to obtain a set of inputs formed by (i) measurements of one or more process variables 1 and (ii) a power demand level as the engine operation set point value 3, and to determine a compressor stator vane angle as a process command value 4. Three tuning variables 5*d*-5*f* are present in the second controller 100*b*; tuning variable 5*d* is a gain applied to the power level demand, tuning variable 5*e* is an input into the control function 110*b* of the second controller 100*b*, and tuning variable 5*f* is an offset applied to the output of the control function 110*b* of the second controller 100*b*.

As in the control system shown in FIGS. 3 and 7, the control system shown in FIG. 8 comprises an event detection unit 200 and database 300 configured in the same manner as described in relation to FIGS. 3 and 7. In the case of FIG. 8, a single event accommodation data array 6 is output from the event detection unit 200 to both the first controller 100*a* and second controller 100*b*. The event accommodation data array 6 contains elements corresponding to each of the tuning variables 5*a*-5*f* present in the first and second controllers 100*a*, 100*b* that the event accommodation data array 6 is output to (i.e. 6 elements, each one corresponding to a respective tuning variable 5*a*-5*f*). Accordingly, each controller 100*a*, 100*b* is configured to update its tuning variables 5*a*-5*f* using the elements of the event accommodation data array that correspond to the tuning variables 5*a*-5*f* contained in that controller 100*a*, 100*b*.

Where the control system comprises a plurality of controllers 100, an alternative configuration to that shown in FIG. 8 is for the event detection unit to output a plurality of event accommodation data arrays 6, each event accommodation data array 6 corresponding to a respective controller 100 by containing elements corresponding to the respective tuning variables 5 of that controller 100.

Figure 9:
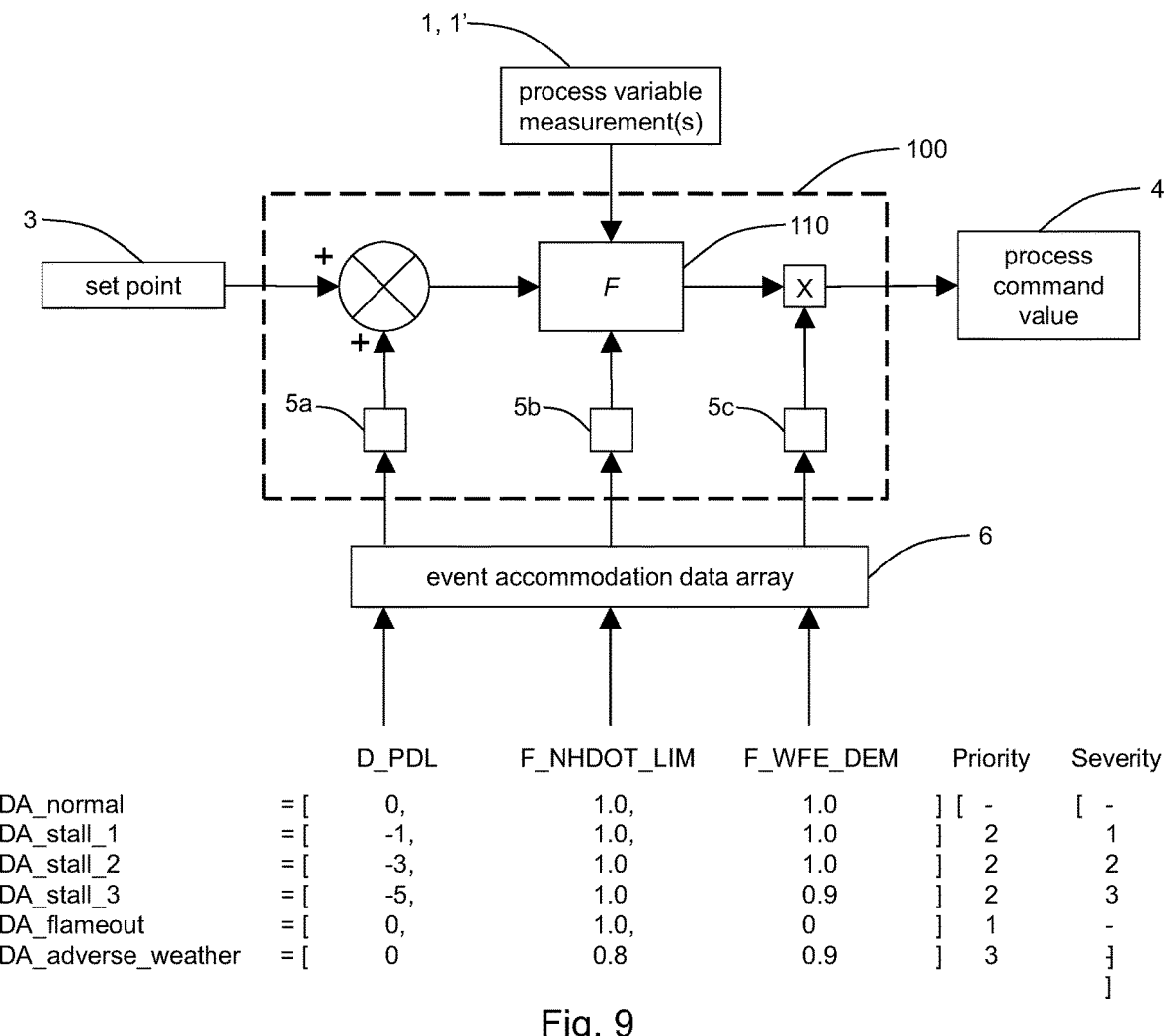
FIG. 9 shows a controller and its control logic, alongside different possible event accommodation data arrays for use with the controller.

FIG. 9 shows the controller 100 of a control system such as those shown in FIGS. 3, 7 and 8. A set of inputs formed by (i) measurements of one or more process variables 1 and (ii) an engine operation set point value 3 is obtained by the controller 100. The controller 100 contains three tuning variables 5*a*-5*c* that, together with the set of inputs, are used to determine a process command value 4 via the control logic. Tuning variable 5*a* is applied as an offset to the set point value 3, tuning variable 5*b* is an input to a control function 110 within the controller and tuning variable 5*c* is applied as a gain to the output of the control function 110.

An event accommodation data array 6 is received by the controller 100 and is used to update the tuning variables 5*a*-5*c* in the controller 100. As discussed above in relation to FIGS. 3, 7 and 8, the event accommodation data array 6 is a pre-set data array selected from a database 300. FIG. 9 presents examples of pre-set data arrays stored in a database 300, alongside a standard data array (DA_normal) also stored in the database 300. Each pre-set data array contained in the database 300 corresponds to a respective abnormal event, the examples in FIG. 9 including three pre-set data arrays corresponding to a compressor stall event (DA_stall_1, DA_stall_2, and DA_stall_3), a pre-set data array corresponding to a main engine flameout event (DA_flameout), and a pre-set data array corresponding to a compressor stall event (DA_adverse_weather).

In the example of FIG. 9, the control system is configured such that the tuning variables 5a-5c are assigned the values of the elements in the event accommodation data array 6 when the tuning variables 5 are updated using the event accommodation data array 6. That is, each tuning variable 5a-5c takes the same values as the corresponding element in the event accommodation data array 6, rather than, for example, the values in the event accommodation data array 6 being subtracted from the values of the respective tuning variables 5a-5c. By way of example, where DA_stall_1 is selected as the event accommodation data array 6 and the tuning variables 5a-5c are updated based on this event accommodation data array 6, tuning variable 5a takes the value of −1, tuning variable 5b takes the value of 1.0 and tuning variable 5c takes the value of 1.0. Comparing DA_stall_1 to DA_normal, it can be seen that only the element D_PDL, corresponding to tuning variable 5a, is assigned an intervention value (i.e. a different value to the value of D_PDL in DA_normal), whereas the other elements of the DA_stall array are assigned standard values (i.e. the same values as those elements in DA_normal). In contrast, in DA_stall_3, both the element D_PDL and the element F_WFE_DEM are assigned intervention values and the intervention value of D_PDL in DA_stall_3 is different to the value of D_PDL in DA_stall_1, thereby illustrating how the present control system can vary both the types of interventions that is implemented in response to detecting an abnormal event and the degree of those interventions without modifying the control logic of the controller 100.

Figure 10:
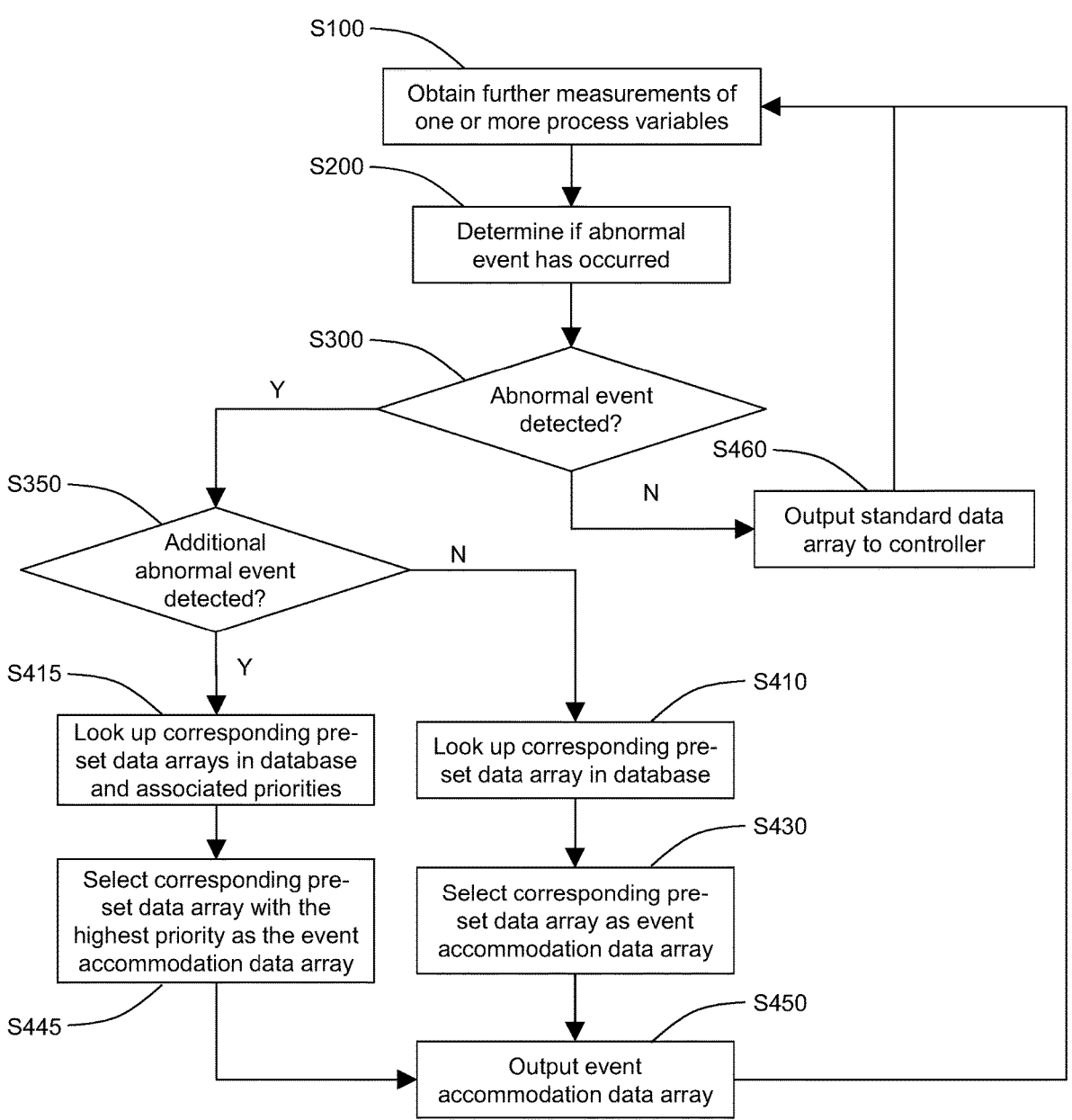
FIG. 10 is a flowchart detailing steps of a control process that is a modification of the control process of FIG. 5.

Additionally, FIG. 9 shows that each pre-set data array has an associated priority, the priority values being stored in a priority data array and contained in the database 300 with the respective pre-set data arrays. Where the event detection unit 200 is further configured to determine whether an additional abnormal event has occurred based on the further measurements of one or more process variables 1, the associated priorities are used in response to determining that an additional abnormal event has occurred to inform a decision as to which of the pre-set data arrays should be selected by the event detection unit 200 to be output as the event accommodation data array 6. The flowchart of FIG. 10 provides an example of how the event detection unit 200 can use these priorities. Steps S100-S300 and S460 in FIG. 10 are the same as those discussed above relation to FIG. 5. However, the flowchart in FIG. 10 differs from that in FIG. 5 in that after an abnormal event is detected (step S300), the event detection unit 200 proceeds to check if an additional abnormal event has also been detected based on the further measurements of one or more process variables 1 (step S350). Where it is determined that no additional abnormal event has been detected, the event detection unit 200 proceeds to steps S410, S430 and S450 as in the flowchart of FIG. 5. However, where an additional abnormal event is detected, the event detection unit 200 proceeds to look up both the pre-set data arrays in the database 300 corresponding to the original abnormal event detected and the pre-set data arrays in the database corresponding to the additional abnormal event detected (step S415) and subsequently selects the pre-set data array corresponding to one of the original abnormal event and the additional abnormal event having the highest priority as the event accommodation data array 6 (step S445). That event accommodation data array 6 is then output (step S450) before the event detection unit 200 returns to obtain further measurements of one or more process variables 1 (step S100).

Referring back to the examples of pre-set data arrays in FIG. 9, if the event detection unit 200 were operating according to the flowchart in FIG. 10 and detected both a main engine flameout event and an adverse weather event, it would be the DA_flameout pre-set data array that corresponds to the main engine flameout event that was selected by the event detection unit 200 as the event accommodation data array 6 in preference to the DA_adverse_weather pre-set data array that corresponds to the adverse weather event, because the priority ranking of the DA_flameout pre-set data array (priority=1) is higher than the priority ranking of with the DA_adverse_weather pre-set data array (priority=3).

Alternatively to using the priority ranking of pre-set data arrays to determine which pre-set data array to select as the event accommodation data array 6, the event detection unit 200, on determining that an additional abnormal event has occurred based on the further measurements of one or more process variables 1, may be configured to output a further event accommodation data array 6 to the controller 100, the controller 100 being configured to receive the further event accommodation data array 6 from the event detection unit and to then update the tuning variables 5 using a combination of the event accommodation data array 6 and the further event accommodation data array 6.

As mentioned above, in FIG. 9 there are three pre-set data arrays corresponding to the same abnormal event of compressor stall: DA_stall_1, DA_stall_2, and DA_stall_3. The plural pre-set data arrays corresponding to the compressor stall event are each assigned a severity value. The severity of a pre-set data array reflects the extent to which the operation of the engine deviates from a normal operational mode when that pre-set data arrays is selected and output as the event accommodation data array 6 by the event detection unit 200. A higher severity (i.e. a larger value) corresponds to a greater deviation from a normal operational mode, i.e. DA_stall_3 is the most severe of the three pre-set data arrays corresponding to the compressor stall event. FIG. 9 shows that the severity values are stored in a severity data array, the severity data array contained in the database 300 with the respective pre-set data arrays.

Figure 11:
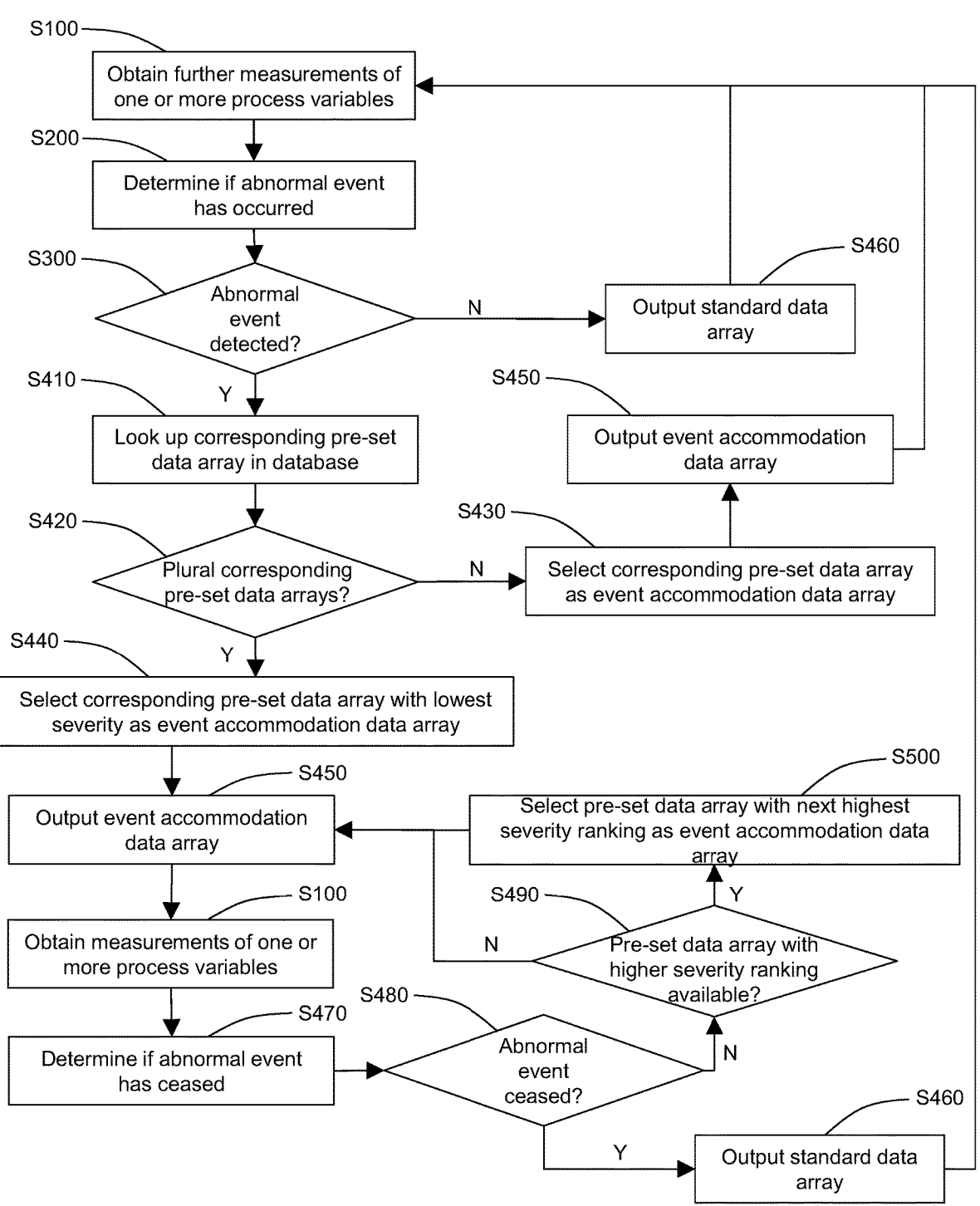
FIG. 11 is a flowchart detailing steps of a control process that is a modification of the control process of FIG. 5.

FIG. 11 is a flowchart providing an example of how the event detection unit 200 can utilise a database 300 containing plural pre-set data arrays corresponding to the same abnormal event and severity values for those pre-set data arrays. Steps S100-S300, S410, S430, S450 and S460 in FIG. 12 are the same as those discussed above in relation to FIG. 5. However, an event detection unit operating according to the flowchart in FIG. 11 is configured to check whether there are plural corresponding pre-set data arrays contained in the database 300 (step S420) after looking up pre-set data arrays in the database that correspond to the detected abnormal event (step S410). Where there are not plural corresponding pre-set data arrays in the database 300, the event detection unit proceeds to select the single corresponding pre-set data array as the event accommodation data array 6 (step S430). However, where there are plural corresponding pre-set data arrays in the database 300, the event detection unit 200 selects the corresponding pre-set data array with the lowest severity as the event accommodation data array 6 (step S440), and then outputs the event accommodation data array 6 (step S450). Subsequent to this, the event detection unit 200 returns to obtain further measurements of one or more process variables 1 (step S100) in order to determine if the previously detected abnormal event has ceased (step S470). Where the abnormal event has ceased (step S480), the event detection unit 200 outputs a standard data array from the database 300 to the controller 100 to cause the tuning variables 5 to be reset to their standard values. However, where it is determined that the abnormal event has not ceased (step S480), the event detection unit 200 then checks whether there is a pre-set data array amongst the plural corresponding pre-set data arrays that has a higher severity than the pre-set data array presently selected as the event accommodation data array 6 (step S490). Where there is one or more of the corresponding pre-set data arrays with a higher severity, the event detection unit 200 selects the corresponding pre-set data array with the next highest severity as the event accommodation data array 6 (step S500) and subsequently returns to output the event accommodation data array 6 (step S450). Where there is no such corresponding pre-set data array (step S490), the previously selected pre-set data array continues to be output as the event accommodation data array 6 (step S450). Typically, the control system is configured to allow a predetermined period of time to pass between the output of an event accommodation data array 6 (step S450) and conducting the subsequent steps of obtaining further measurements of one or more process variables 1 (step S100) and determining whether the abnormal event has ceased (step S470). This allows time for the present event accommodation data array 6 to be used to update the tuning variables 5 and for the updated tuning variables 5 to influence the operation of the engine and possibly cause the cessation of the abnormal event.

Referring back to the examples of pre-set data arrays in FIG. 9, if the event detection unit 200 were operating according to the flowchart in FIG. 11 and detected an adverse weather event, it would be the DA_stall_1 pre-set data array that was selected by the event detection unit 200 as the event accommodation data array 6 first, in preference to the DA_stall_2 and DA_stall_3 pre-set data arrays, because the severity associated with the DA_stall_1 pre-set data array (severity=1) is lower than the severities associated with the DA_stall_2 and DA_stall_3 pre-set data arrays (severity 2 and 3, respectively). However, if the event detection unit subsequently determines that the abnormal event has not ceased following the tuning variables 5 being updated based on the event accommodation data array 6, the event detection unit would determine that DA_stall_2 and DA_stall_3 have higher severity than DA_stall_1 and accordingly select DA_stall_2, as the corresponding pre-set data array with the next highest severity, as the event accommodation data array 6. A similar process would then repeat is the abnormal event did not cease following the tuning variables being updated based on the event accommodation data array, leading to the selection of DA_stall_3 as the event accommodation data array 6.

Embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer readable medium. One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It will be understood that the invention is not limited to the above-described features and embodiments and various modifications and improvements can be made without departing from the concepts described herein. Except where mutually exclusive, the features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A computer-based control system for a gas turbine engine, comprising:
   a controller comprising control logic, the controller configured to obtain a set of inputs formed by (i) measurements of one or more process variables and (ii) values of one or more engine operation set points, and the control logic configured to determine one or more process command values for operation of the gas turbine engine in response to the set of inputs; and
   an event detection unit configured to obtain further measurements of one or more process variables and determine whether an abnormal event has occurred based on the further measurements of one or more process variables; and
   wherein:
   the controller comprises a plurality of tuning variables for altering the one or more process command values output by the control logic in response to a given set of inputs, the tuning variables having respective standard values for normal operation of the gas turbine engine;
   the event detection unit is configured to output an event accommodation data array to the controller when an abnormal event is detected, each element in the event accommodation data array corresponding to a respective tuning variable and one or more of the elements assigned intervention values for their respective tuning variables;
   the controller is configured to update the tuning variables using the event accommodation data array, a given tuning variable being changed in response to detection of a given abnormal event when the respective element in the event accommodation data array is assigned an intervention value, and wherein the control system further comprises a database containing a plurality of pre-set data arrays for output as event accommodation data arrays, the event detection unit being configured to select one of the pre-set data arrays as the event accommodation data array;
   the pre-set data arrays correspond to respective abnormal events; and
   the event detection unit is configured to select a given pre-set data array as the event accommodation data array in response to detecting the respective abnormal event for that pre-set data array.

2. The control system according to claim 1, wherein:
   the database contains:
   plural pre-set data arrays corresponding to a given abnormal event; and
   a severity value for each of said plural pre-set data arrays; and the event detection unit is further configured to:
   select the pre-set data array having the lowest severity value within said plural pre-set data arrays as the event accommodation data array in response to detecting the respective abnormal event for said plural pre-set data arrays; and
   subsequently sequentially select said plural pre-set data arrays as the event accommodation data array in order of increasing severity until cessation of detection of the abnormal event.

3. The control system according to claim 2, wherein the event detection unit is configured to select the next pre-set data array in the sequence in response to a pre-determined period of time passing since the present event accommodation data array was selected.

4. The control system according to claim 1, wherein:
   the database further comprises an associated priority for each pre-set data array; and
   the event detection unit is further configured to:
   determine whether an additional abnormal event has occurred based on the further measurements of one or more process variables; and
   select the pre-set data array having the highest priority amongst the pre-set data arrays corresponding to the detected abnormal events as the event accommodation data array in response to determining that an additional abnormal event has occurred.

5. The control system according to claim 1, wherein:
   the event detection unit is further configured to determine whether an additional abnormal event has occurred based on the further measurements of one or more process variables and to output a further event accommodation data array to the controller when a further abnormal event is detected; and
   the controller is further configured to receive the further event accommodation data array from the event detection unit and to update the tuning variables using a combination of the event accommodation data array and the further event accommodation data array.

6. The control system according to claim 1, wherein the event detection unit is further configured such that, having detected an abnormal event and output the event accommodation data array to the controller, the event detection unit outputs a standard data array to the controller on cessation of detection of the abnormal event, each element in the standard data array being assigned a standard value corresponding to the standard value of its respective tuning variable.

7. The control system according to claim 1, wherein the control logic is configured to apply one or more of the tuning variables as gains within the control logic.

8. The control system according to claim 1, wherein the control logic is configured to apply one or more of the tuning variables as offsets within the control logic.

9. The control system according to claim 1, wherein the event detection unit is configured to detect one or more abnormal events from a group including:
   overspeed of the gas turbine engine;
   overspeed of one or more compressors;
   over-power of the gas turbine engine;
   over-torque of the gas turbine engine;
   main engine flameout;
   afterburner flameout;
   afterburner buzz;
   afterburner screech;
   control-system sensor input fault;
   main engine surge;

surge of one or more compressors;

nozzle positioning error;

main engine fuel metering error;

afterburner fuel metering error;

variable inlet guide vane position error;

bleed air duct rupture within engine;

bleed air duct rupture within the engine installation envelope;

fault within an embedded electrical machine;

panic-button pressed;

compressor stall; and adverse weather.

10. The control system according to claim 1, wherein the tuning variables are selected from a group including:

a power level demand offset;

a maximum acceleration and deceleration limit a fuel flow demand gain;

a nozzle area demand offset;

a primary afterburner fuel flow demand gain;

a core afterburner fuel flow demand gain;

a bypass afterburner fuel flow demand gain;

an afterburner fuel cut off Boolean; and an operator display text field setting.

11. The control system according to claim 1, wherein the one or more process command values are selected from a group including:

an actuator demand;

a fuel flow demand;

a bleed valve position;

a compressor stator vane angle;

a tip clearance;

an ignition signal; and an engine starter signal.

12. A gas turbine engine comprising the control system according to claim 1, wherein the controller is configured to output the one or more process command values to operate the gas turbine engine.

13. A computer implemented method of detecting and accommodating an abnormal event in the operation of a gas turbine engine using a control system, wherein:

the control system comprises a controller, the controller comprising control logic and being configured to obtain a set of inputs formed by (i) measurements of one or more process variables and (ii) values of one or more set points;

the control logic is configured to determine one or more process command values for operation of the gas turbine engine in response to the set of inputs; and the controller further comprises a plurality of tuning variables for altering the one or more process command values output by the control logic in response to a given set of inputs, the tuning variables having respective standard values for normal operation of the gas turbine engine; and the method comprises the steps of:

obtaining further measurements of one or more process variables;

determining whether an abnormal event has occurred based on the further measurements of one or more process variables;

outputting an event accommodation data array in response to detecting an abnormal event, each element in the event accommodation data array corresponding to a respective tuning variable and one or more of the elements assigned intervention values for their respective tuning variables; and updating the tuning variables using the event accommodation data array, a given tuning variable being changed in response to detection of a given abnormal event when the respective element in the event accommodation data array is assigned an intervention value, the control system further comprising a database containing a plurality of pre-set data arrays for output as event accommodation data arrays, the event detection unit being configured to select one of the pre-set data arrays as the event accommodation data array, the pre-set data arrays corresponding to respective normal events; and selecting a given pre-set data array as the event accommodation data array in response to detecting the respective abnormal event for that pre-set data array.

* * * * *